Patented Sept. 7, 1948

2,448,987

UNITED STATES PATENT OFFICE 2,448,987

SYNTHETIC DRYING OILS FROM A DITHIOL AND DIVINYLACETYLENE

Carl M. Langkammerer, Wilmington, Del., assignor to E. I. du Pont de Nemours & Company, Wilmington, Del., a corporation of Delaware No Drawing. Application September 29, 1944, Serial No. 556,487

12 Claims. (Cl. 260—79)

This invention relates to compositions of matter and more particularly to new polymeric materials, also referred to herein as synthetic drying oils, having the property of drying and hardening in the presence of air.

In spite of the great need for synthetic drying oils to replace the natural products, whose quality and availability are often uncertain, few of the materials heretofore proposed have achieved commercial importance, chiefly because the films obtained therefrom are not entirely free from mechanical defects such as brittleness or because they have insufficient resistance to chemicals.

This invention has as an object the production of new synthetic drying oils. Further objects reside in methods for obtaining self-hardening polymers by the use of cheap and readily available starting materials. A still further object is to provide new films and coatings characterized by exceptionally high resistance to chemicals, toughness, flexibility, adhesion to metals, and resistance to mechanical deformations. Other objects will appear hereinafter.

These objects are accomplished by the invention of film-forming, polymeric, thio ether drying oils and of a method, more particularly described below, for obtaining them. The polymeric thio ether drying oils of this invention have a viscosity of 1 to 15 poises at 25° C., a molecular weight of at least 350, and are the reaction product of divinylacetylene and a dithiol in the proportion of from 0.8 to 1.2 mols of divinylacetylene. These polymeric thio ethers are obtained by heating a dithiol and divinylacetylene in the above mentioned proportions with a catalytic amount of an alkali metal hydroxide or hydrosulfide and a co-solvent for the catalyst and reactants, continuing the reaction until the dithiol is essentially all combined with the divinylacetylene, and stopping the reaction before gelation takes place, i. e., while the reaction mixture is still fluid.

The products obtained in accordance with this invention are linear polymeric thio ethers containing acetylenic linkages, formed by the addition of dithiols to the double bonds of divinylacetylene. The composition of the products obtained by reacting equimolecular amounts of a dithiol and of divinylacetylene corresponds to that of an addition product of 1 mole of the dithiol to 1 mole of divinylacetylene. The thio ether structure is substantiated by the fact that the product reacts with active chlorine-containing compounds such as Chloramine-T and Dichloramine-T to give the corresponding sulfylamines, i. e., compounds having a p-toluenesulfimido group attached to the thio ether sulfur through a semi-polar bond. The products contain, in general, a small amount of residual thio groups, as shown by the presence of between 0.5% and 10% of thiol sulfur.

The invention is illustrated by the following examples in which parts are by weight.

Example I

One hundred parts of a 60% solution in a high aromatic hydrocarbon diluent (chiefly xylene) of technical divinylacetylene containing 20–25% by weight of the isomeric hexadiene-1, 3-yne-5, 73.5 parts of ethanedithiol and a solution of 3.1 parts of sodium hydrosulfide in 98.5 parts of absolute ethanol are mixed in a vessel equipped with a reflux condenser and heated on a steam bath to refluxing temperature (72–75° C.). Heating is discontinued after forty-eight hours and the reaction mixture is allowed to cool. The lower layer which contains substantially all the polymeric product is separated and washed by agitating with water. The oil is again separated and heated on a steam bath under 5–20 mm. pressure until all volatile material is removed. The yield is about 70% of a polymeric thio ether having a viscosity of about 3 poises at 25° C. and a molecular weight of about 425.

Anal., calc'd. for unit $C_6H_{12}S_2$: S, 37.2%; found: total sulfur 37.1%, thiol sulfur, 0.75%.

Example II

One hundred parts of a 45% solution of technical divinylacetylene, containing 20–25% of hexadiene-1,3-yne-5, in naphtha diluent, 54 parts of ethanedithiol and a solution of 2.3 parts of potassium hydroxide in 120 parts of 95% ethanol are mixed in a vessel equipped with a reflux condenser and heated on a steam bath to the reflux temperature (72–75° C.) for twenty hours. At the end of this time reaction is at an apparent end and 90% of the ethanedithiol has been consumed. The reaction mixture is allowed to cool, about 125 parts of water are added and the lower, oily layer is separated. The oil is transferred to a vessel equipped with a downward condenser and steam is passed through the oil until substantially no volatile material is carried over into the distillate. The oil is then taken up in benzene (ethylene chloride may be used), dried over anhydrous sodium sulfate and the solution heated on the steam bath under 5–20 mm. pressure until only non-volatile oil remains. The yield is about 90°. The polymeric thio ether contains 2.2% of thiol sulfur. It has a viscosity of about 2.5 poises at 25° C. and a molecular weight of about 375.

*Example III*

One hundred parts of divinylacetylene (98–100% pure), 141 parts of propanedithiol-1,2, and a solution of 5.2 parts of potassium hydroxide in 370 parts of 95% ethanol are mixed in a vessel equipped with a reflux condenser and heated on a steam bath to the reflux temperature (72–75° C.) for twenty hours. Sufficient water is added to the cold reaction mixture to discharge the oil layer completely and the latter is separated. After subjecting the oil to steam distillation until no more volatile material can be removed, it is taken up in benzene and the solution dried over anhydrous sodium sulfate. The benzene solution is heated on the steam bath under 5–20 mm. pressure until only the non-volatile oil remains. The yield is 68–70% of polymeric thio ether containing 5.3% of thiol sulfur, having a viscosity of 3.25 poises at 25° C. and a molecular weight of 467.

Anal. calc'd. for unit $C_9H_{14}S_2$: S, 34.7%; found: 33.8%.

*Example IV*

One hundred parts of pure divinylacetylene, 118 parts of ethanedithiol, 340 parts of 95% ethanol and 5.1 parts of potassium hydroxide are heated in a vessel equipped with a reflux condenser to boiling (72–75° C.) for thirty-six hours. The product is then allowed to cool, diluted with an equal volume of water and the lower layer of oil separated. The oil is heated on a steam bath and subjected to steam distillation until all volatile materials are removed. The residue is taken up with a little benzene, separated and dried over anhydrous magnesium sulfate. After filtering, the oil is transferred to another vessel and the benzene removed by distillation under reduced pressure. The yield of oil is 174 parts or 80% of the theoretical.

The polymeric thio ether contains 0.72% sulfur in the form of the sulfhydryl group. The viscosity is 12.9 poises and the average molecular weight is 652.

While, in the preceding examples, the reactants are used in approximately equimolecular ratio, a slight excess of either reactant may be employed without appreciably modifying the properties of the resulting polymer. In the following example, an excess of divinylacetylene is used, and it participates in the polymerization.

*Example V*

One hundred parts of a 60% solution of technical divinylacetylene (20–25% hexadiene-1,3-yne-5) in naphtha diluent 54 parts of ethanedithiol and 2.3 parts of potassium hydroxide dissolved in 114 parts of methanol are refluxed on a steam bath (reaction temperature, 63–65° C.) for 22 hours. After cooling, water is added and the oil which separates as the lower layer is removed. Steam is passed into this oily material until all volatile constituents are substantially removed, after which the oil is separated from the water and dried by heating at 100° C. and 5–20 mm. pressure until it is free from water. There is obtained 74.5 parts of a viscous oil containing by analysis 34.9% of total sulfur and 9.6% of thiol sulfur and having a molecular weight and viscosity comparable to those of the products of the preceding examples. This composition corresponds to an average of 1.2 moles of divinylacetylene combined with 1 mole of ethanedithiol.

Conversely, there may be used an excess of dithiol. For example, heating a mixture of 1 mole of 1,2-propanedithiol and 0.8 mole of divinylacetylene under the conditions just described gives a product which is not fundamentally different in properties from that obtained by reacting equimolecular amounts of the reaction. However, it is not recommended to vary the proportions of reactants much beyond the already mentioned ratio of 1 mole or dithiol to between 0.8 and 1.2 moles of divinyl acetylene, since increasing the ratio of either reactant beyond that mentioned influences adversely the properties of films. For example, if too much dithiol is used, the film is not odor-free, it has less resistance to chemicals and it dries slower. If too great an excess of divinylacetylene is used, the film has a tendency to become brittle. The preferred compositions are prepared by using substantially equimolecular ratios of dithiols and divinylacetylene.

In the preparation of the polymeric thio ethers of this invention, any dithiol having the thiol groups on different carbon atoms is suitable. In addition to the dithiols mentioned in the examples, there can be used 1,4-butanedithiol, 1,6-hexanedithiol, 1,10-decanedithiol, benzene dithiol, beta, beta'-dimercaptodiethyl ether, beta, beta'-dimercaptodiethyl sulfide, cyclohexanedithiol, etc. The thiols can contain other substituent groups, as in 2,3-dimercaptopropanol or alpha, alpha'-dimercaptoadipic acid. The preferred thiols are the saturated aliphatic dithiols containing no other substituents and, of these, ethanedithiol and 1,2-propanedithiol are the most useful species.

It is convenient and even desirable, to use technical divinylacetylene rather than the purified material. Technical divinylacetylene, as obtained in the manufacture of monovinylacetylene, contains between about 5% and about 25% by weight of its isomer, hexadiene-1,3-yne-5 (see U. S. Patent 2,173,272). This product is not only cheaper than purified divinylacetylene, but it has also the advantage of giving, with dithiols, drying oils having a faster drying rate.

The reaction is preferably carried out with approximately equimolecular proportions of reactants, although, as pointed out before, a moderate excess of either reactant, e. g., between 0.8 and 1.2 moles of divinylacetylene per mole of dithiol, may be used. It is necessary, in order to obtain the desired results, to carry out the reaction in the presence of a solvent for both the catalyst and the initial reactants, since when this precaution is not observed, the reaction is difficult to control and there is danger of premature gelation. The most useful of such cosolvents are monohydric alcohols, including methanol, ethanol, isopropanol, butanol, etc. It is known that alcohols react with divinylacetylene under certain special conditions (see U. S. Patent 2,013,725) but this does not interfere with the reaction of the dithiol with divinylacetylene since thiol groups react much faster than hydroxyl groups. The final product, therefore, does not contain any appreciable amount of alcohol-divinylacetylene addition product, as shown by the fact that there is in general less than 2.5% of oxygen in even the crude thio ether. Other diluents such as toluene, xylene, commercial hydrocarbon mixture, etc., may, of course, be present, provided there is sufficient cosolvent to dissolve the catalyst and reactants. The alcohol cosolvents need not be anhydrous.

The reaction proceeds satisfactorily only at elevated temperature, which in practice is above 60° C. to about 105° C. at which temperature the divinlyacetylene becomes unstable. The range between 60° C. and 100° C. is preferred because, at higher temperatures, the reaction may become difficult to control and gelation may take place. Superatmospheric pressures may be used if desired, particularly when low boiling solvents or reactants are used.

The reaction is continued until a product having a viscosity suitable for a film-forming material is obtained, which means in practice a viscosity of at least one poise at 25° C. This stage of the reaction can readily be determined by preliminary trial. Another indication of sufficient reaction is given by iodometric titration of the free thiol groups on a sample. The reaction should be stopped before gelation takes place, i. e. while the reaction mixture is still fluid. Under such conditions, the product will have a viscosity not exceeding 15 poises at 25° C. In general, the reaction time at a temperature of 60–100° C. is between 12 and 50 hours.

The use of a catalyst in the reaction is essential to obtain a practical reaction rate and to permit adequate control of the reaction. The catalysts suitable for use in this process comprise the alkali metal hydroxides and the alkali metal hydrosulfides, examples of which are the hydroxides of sodium, potassium, and lithium; potassium hydrosulfide, sodium hydrosulfide, etc. Mixtures of these catalysts can be used. The alkali hydrosulfides can be prepared in situ by passing hydrogen sulfide through the reaction mixture containing a solution of an alkali hydroxide. The catalysts are preferably used in amounts between 1% and 10% based on the weight of the dithiol, preferably between 1% and 5% by weight of the dithiol.

Solutions of the polymeric thio ethers of this invention in organic solvent, before hardening, with or without driers, can be used as vehicles for grinding pigments such as ferric oxide or titanium dioxide, giving well dispersed paints of excellent quality. Other materials besides pigments, such as plasticizers, fillers, reinforcing agents, resins, drying oils, may be blended with the polymeric thio ethers to modify the properties of the films obtained by air drying. Of particular interest in this connection are phenol/formaldehyde resins, whether of the heat hardening or non-hardening type. These resins are compatible with the polymeric thio ethers over a wide range of proportions. For example, addition of 10% by weight of a p-hydroxydiphenyl/formaldehyde resin (sold commercially as Resin BR-254) and of 0.1% by weight of manganese naphthenate to a solution of ethanedithiol-divinylacetylene condensation product in butyl acetate gives a coating composition which yields a hard and flexible film when baked on a metal surface. Baking this film on a steel plate for 20 hours at 100° C. or for 1 hour at 160° C. yields a hard, smooth film having good resistance to alkalies and acids and capable of bending without cracking. Multiple coatings may be applied using the same baking schedule to give thicker films, if desired.

The polymeric thio ethers of this invention are viscous, practically colorless oils having a viscosity at 25° C. of between about 1 poise and about 15 poises, and a molecular weight of at least 350 to 700 or more, as determined by ebullioscopy in a suitable solvent such as benzene. They have the property of being converted in the presence of air, particularly under the influence of heat, to tough, adherent, flexible, chemically resistant films. These films can be prepared by spreading the polymeric thio ether over a substrate such as glass, metal or wood, etc., when the polymer is sufficiently fluid to lend itself to this operation. Preferably, a solution of the polymeric thio ether in any suitable solvent such as toluene, xylene, commercial hydrocarbon mixtures, etc. is prepared, spread over the substrate and evaporated. Thin coatings thus obtained dry tack-free in the presence of air at room temperature, but such a process is in general slow and it is preferred to accelerate the drying by heating. Desirably, any of the well-known drying accelerators used in drying oils, such as cobalt or manganese naphthenates or linoleates, may be added before or during the baking process. For example, a solution of the ethanedithiol-divinyl acetylene condensation product of Example 1 is dissolved in equal parts of xylene and to this solution is added 1% of eugenol (which prevents too rapid surface drying and wrinkling) and 0.1% of manganese (as manganese naphthenate drier solution) based on the weight of the polymer. Films of 0.5 to 1.0 mil thickness of this material set tack-free in 3-6 hours and harden in 24 hours at room temperature. The films show excellent adhesion to glass; they are flexible and odorless and they do not discolor or become brittle after several months aging. Films baked on steel at 100° C. for 4-15 hours, or at 150° C. for 1 hour, or at 200° C. for 3-5 minutes have excellent hardness, adhesion and flexibility, in addition to outstanding resistance to the action of alkalies and acids. For example, films of about 1 mil thickness baked on thin steel panels at 150° C. for 1 hour do not crack or show appreciable loss of adhesion when bent at a 180° angle around a ⅛ inch mandrel. These panels, or the films baked thereon, show no deterioration after 24 hours exposure to 20% aqueous sodium hydroxide, 10% sulfuric acid and 5-100% acetic acid, or to organic solvents such as xylene, kerosene, acetone or butyl acetate.

As many apparently widely different embodiments of this invention may be made without departing from the spirit and scope thereof, it is to be understood that this invention is not to be limited to the specific embodiments thereof, except as defined in the appended claims.

I claim:

1. A process for preparing a film-forming, air-drying polymeric thio ether which comprises heating at a temperature of from 60° C. to 105° C. reactants comprising one mole of a dithiol and from 0.8 to 1.2 moles of divinylacetylene in the presence of a catalyst and in the presence of a cosolvent for the catalyst and reactants until the dithiol is essentially all combined with the divinylacetylene and until the reaction product has a viscosity of at least one poise at 25° C., and stopping the reaction before gelation takes place, said catalyst being selected from the group consisting of alkali metal hydroxides and alkali metal hydrosulfides.

2. A process for preparing a film-forming, air drying polymeric thio ether which comprises heating at a temperature of from 60° C. to 105° C. reactants comprising equimolecular amounts of a dithiol and divinylacetylene in the presence of a basic catalyst and in the presence of a cosolvent for the catalyst and reactants until the dithiol is essentially all combined with the divinylacetylene and until the reaction product has a viscosity of at least one poise at 25° C., and stopping the reaction before gelation takes place, said catalyst being selected from the group consisting of alkali metal hydroxides and alkali metal hydrosulfides.

3. A process for preparing a film-forming, air drying polymeric thio ether which comprises heating at a temperature of from 60° C. to 105° C. reactants comprising a dithiol and divinylacetylene containing from 5% to 25% hexadiene-1,3-yne-5 in the presence of a catalyst and in the presence of a cosolvent for the catalyst and reactants until the dithiol is essentially all combined with the divinylacetylene and until the reaction product has a viscosity of at least one poise at 25° C., and stopping the reaction before gelation takes place, said reactants being present in the proportion of one mole of dithiol and from 0.8 to 1.2 moles of divinylacetylene, said catalyst being selected from the group consisting of alkali metal hydroxides and alkali metal hydrosulfides.

4. A process for preparing a film-forming, air-drying polymeric thio ether which comprises heating at a temperature of from 60° C. to 105° C. reactants comprising one mole of an aliphatic dithiol and from 0.8 to 1.2 moles of divinylacetylene in the presence of a catalyst and in the presence of a cosolvent for the catalyst and reactants until the dithiol is essentially all combined with the divinylacetylene and until the reaction product has a viscosity of at least one poise at 25° C., and stopping the reaction before gelation takes place, said catalyst being selected from the group consisting of alkali metal hydroxides and alkali metal hydrosulfides.

5. A process for preparing a film-forming, air-drying polymeric thio ether which comprises heating at a temperature of from 60° C. to 105° C. reactants comprising one mole of ethanedithiol and from 0.8 to 1.2 moles of divinylacetylene in the presence of a catalyst and in the presence of a cosolvent for the catalyst and reactants until the dithiol is essentially all combined with the divinylacetylene and until the reaction product has a viscosity of at least one poise at 25° C., and stopping the reaction before gelation takes place, said catalyst being selected from the group consisting of alkali metal hydroxides and alkali metal hydrosulfides.

6. A process for preparing a film-forming, air-drying polymeric thio ether which comprises heating at a temperature of from 60° C. to 105° C. reactants comprising one mole of propanedithiol and from 0.8 to 1.2 moles of divinylacetlyene in the presence of a catalyst and in the presence of a cosolvent for the catalyst and reactants until the dithiol is essentially all combined with the divinylacetlyene and until the reaction product has a viscosity of at least one poise at 25° C., and stopping the reaction before gelation takes place, said catalyst being selected from the group consisting of alkali metal hydroxides and alkali metal hydrosulfides.

7. A film-forming, polymeric thio ether drying oil containing not more than about 10% thiol sulfur and having a molecular weight of at least 350 and a viscosity of from 1 to 15 poises at 25° C., said polymeric thio ether drying oil being the product obtained by the process set forth in claim 1.

8. A film-forming, polymeric thio ether drying oil containing not more than about 10% thiol sulfur and having a molecular weight of at least 350 and a viscosity of from 1 to 15 poises at 25° C., said polymeric thio ether drying oil being the product obtained by the process set forth in claim 2.

9. A film-forming, polymeric thio ether drying oil containing not more than about 10% thiol sulfur and having a molecular weight of at least 350 and a viscosity of from 1 to 15 poises at 25° C., said polymeric thio ether drying oil being the product obtained by the process set forth in claim 3.

10. A film-forming, polymeric thio ether drying oil containing not more than about 10% thiol sulfur and having a molecular weight of at least 350 and a viscosity of from 1 to 15 poises at 25° C., said polymeric thio ether drying oil being the product obtained by the process set forth in claim 4.

11. A film-forming, polymeric thio ether drying oil containing not more than about 10% thiol sulfur and having a molecular weight of at least 350 and a viscosity of from 1 to 15 poises at 25° C., said polymeric thio ether drying oil being the product obtained by the process set forth in claim 5.

12. A film-forming, polymeric thio ether drying oil containing not more than about 10% sulfur and having a molecular weight of at least 350 and a viscosity of from 1 to 15 poises at 25° C., said polymeric thio ether drying oil being the product obtained by the process set forth in claim 6.

CARL M. LANGKAMMERER.

REFERENCES CITED

The following references are of record in the file of this patent:

UNITED STATES PATENTS

| Number | Name | Date |
|---|---|---|
| 2,347,182 | Coffman | Apr. 25, 1944 |
| 2,351,108 | Collins | June 13, 1944 |